Dec. 7, 1926.
C. O. GUERNSEY
1,610,132
REMOTE CONTROL MECHANISM FOR GEARING
Filed March 5, 1925    2 Sheets-Sheet 1
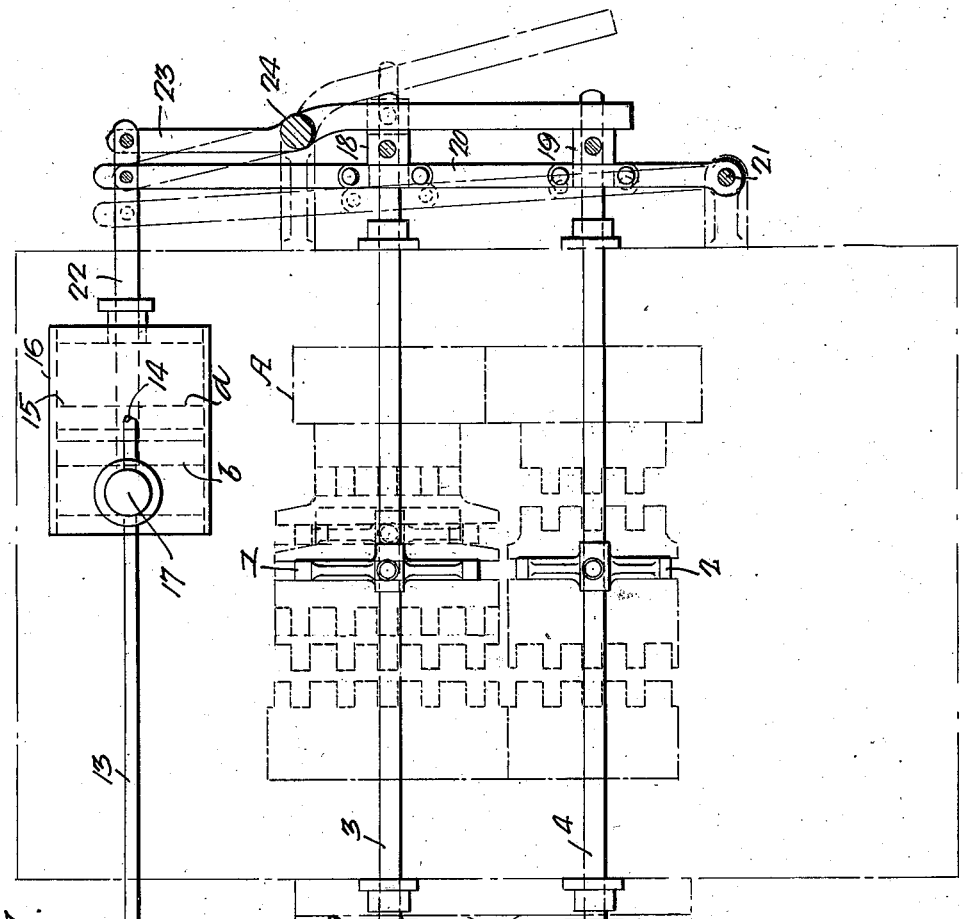
Inventor:—
Charles O. Guernsey.
by his Attorneys.
Howson & Howson

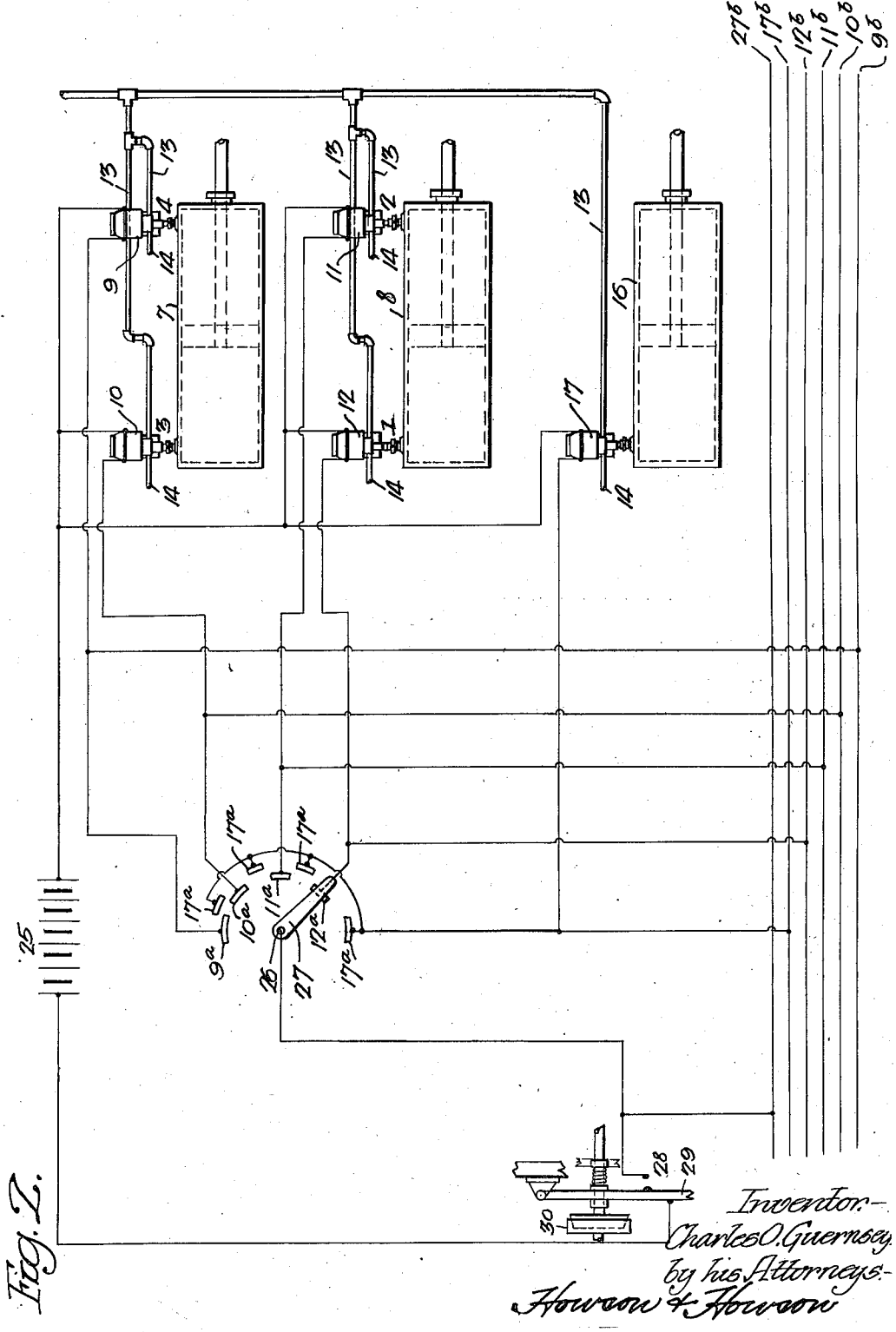

Patented Dec. 7, 1926.

1,610,132

UNITED STATES PATENT OFFICE.

CHARLES O. GUERNSEY, OF PHILADELPHIA, PENNSYLVANIA.

REMOTE-CONTROL MECHANISM FOR GEARING.

Application filed March 5, 1925. Serial No. 13,412.

This invention is applicable to vehicles driven by internal combustion engines, particularly large and heavy vehicles such as busses and railway cars. The invention relates particularly to mechanism whereby the operator can shift the gearing to change the speed ratio conveniently and with a minimum of effort.

One of the objects of the invention is to provide a remote control mechanism of the type referred to, having an improved interlocking connection with the clutch whereby it is made inoperative when the clutch is engaged. Another object of the invention is, to provide an improved arrangement of air cylinders for shifting the gearing to the various operative positions and to the neutral position. Another object of the invention is to provide improved electro-magnetic means whereby the operation of the air cylinders is controlled. Further objects of the invention will be apparent from the following specification and claims.

In the accompanying drawings I have shown the embodiments of the invention which I now deem preferable, but it will be understood that the drawings are for illustrative purposes only and that various changes and substitutions can be made within the scope of the claims without departing from the spirit of the invention.

Of the drawings.

Fig. 1 is a diagrammatic view showing the arrangement of the pneumatic cylinders and the parts mechanically connected therewith.

Fig. 2 is a diagram of electrical connections.

Fig. 3 is a diagrammatic perspective view showing an alternate form of electric controller.

Referring to the drawings, particularly Fig. 1, A represents a change speed gearing which may be of any usual or preferred type. This gearing by itself constitutes no part of my present invention and detailed description will be omitted. For operating the gearing two shifting members 1 and 2 are provided, these being mounted respectively on longitudinally slidable rods 3 and 4. It will be understood that in the operation of the gearing either of the shifting members can be moved either to the right or to the left from the neutral positions which are shown. Dotted lines in the drawing shows the shifting member 1 in its right hand position.

For moving the shifting members 1 and 2 pistons 5 and 6 are connected respectively with the rods 3 and 4, and these pistons are slidable respectively in cylinders 7 and 8. Each cylinder is closed at each end and is provided with two controlling valves. The valves for the cylinders 7 are indicated at 9 and 10 and the valves for the cylinder 8 are indicated at 11 and 12. Each valve is so constructed that in one position it serves to connect an air supply pipe 13 with the interior of the corresponding end of the cylinder. In another position each valve serves to connect the interior of the corresponding end of the cylinder with one of the exhaust pipes 14. From the foregoing description it will be apparent that by connecting one end of either cylinder with the air supply and the other end with the exhaust, the piston can be moved to thereby shift the gearing. By operating the proper valves either one of the shifting members 1 or 2 can be moved in either direction.
I prefer to provide a neutralizing device separate from the pistons, 5 and 6, for returning the shifting members to their central or neutral positions. For this purpose I provide a piston 15 which is slidable within a cylinder 16. A single controlling valve 17 is provided for the cylinder 16, this valve being similar to the valves already described and serving to connect the interior of the cylinder either with one of the air supply pipes 13 or with one of the exhaust pipes 14.

In the drawing a represents the position which the piston 15 normally occupies when both of the shifting members, 1 and 2 are in their neutral positions. Suitable mechanism is provided whereby the piston 15 is moved to a position b when either one of the shifting members 1 or 2 is moved to one of its operative positions. As illustrated the rods 3 and 4 are provided respectively with pivotally connected yokes 18 and 19. A lever 20 has a fixed pivot at one end as indicated at 21, and at its other end it is connected with the piston rod 22 which is movable with the piston 15. This link 20 is adapted to be engaged by the yokes 18 and 19 so that the lever 20 and also the rod 22 and the piston 15 are moved toward the left when either one of the shifting members is moved toward the left. A second lever 23 is provided and this lever is provided with a fixed pivot at 24 between its ends. One end of the lever is connected with the rod 22 and the other end of the lever is extended so that it can be engaged by either one of the yokes, 18 or 19. Thus when either one of the shifting members is moved toward the right the lever 23 is moved in the direction to move the rod 22 and the piston 15 toward the left.

Inasmuch as any movement of one of the shifting members 1 or 2 causes the piston 15 to be moved toward the left, it will be apparent that if air is admitted to the left hand end of the cylinder, the piston in moving toward the right will restore either one of the shifting members to its central or neutral position.

I prefer to provide electro-magnetic means for operating the control valves and in Fig. 2 I have shown electro-magnetic valves which may be of any usual or preferred construction. The valves are so arranged and connected that each of them when de-energized serves to connect one end of the corresponding cylinder with the exhaust. When energized the end of the corresponding cylinder is connected with the air supply.

25 represents a battery or other source of current and this is connected directly with one side of each of the electro-magnetic valves, 9, 10, 11, 12 and 17. The return circuit from the valves is through a suitable controller 26. This controller has contacts $9^a$, $10^a$, $11^a$ and $12^a$ connected respectively with the valves 9, 10, 11 and 12. It is also provided with four contacts $17^a$, which are located in alternate relationship with the said contacts $9^a$, $10^a$, $11^a$ and $12^a$. A single contact arm 27 is movable to engage any one of the aforesaid contacts. This contact arm is adapted to complete the circuit and energize any valve corresponding to the contact which may be engaged. It will be seen in moving from one to another of the contacts $9^a$, $10^a$, $11^a$ and $12^a$, one of the contacts $17^a$ must be engaged. The result is that the neutralizing device is automatically operated to return the parts to neutral position prior to the admission of air to any one of the valves 9, 10, 11 and 12.

Preferably a switch 28 is connected in the circuit in series with the controller 26. This switch is connected with the operating lever 29 for a clutch 30, and the arrangement is such that the circuit is broken whenever the clutch is engaged and the circuit is completed whenever the clutch is disengaged. Therefore, the controller 26 is inoperative to open any of the valves when the clutch is engaged. The mechanism is readily adaptable for use with a mutiple controller system in which one or more additional controllers similar to the controller 26 are provided. Conductors adapted to be connected with such additional controllers are shown at $9^b$, $10^b$, $11^b$, $12^b$, $17^b$ and $27^b$.

In Fig. 3 I have shown a substitute form of controller which can be used if preferred. This figure shows a control lever 31 which is mounted to operate with the conventional H-movement which is standard in automobile practice. As illustrated, the lever has a ball and socket mounting at 32 and is provided at its lower end with a contact $27^c$ adapted to engage in one of the contacts $9^c$, $10^c$, $11^c$ and $12^c$. A fifth contact $17^c$ is provided in such a position that it is engaged by the contact $27^c$ in moving from engagement with one of said contacts into engagement with another. The results are the same as already described and repetition is unnecessary.

What I claim is:

1. In a remote control system of the type described, the combination with shiftable gearing, a clutch and clutch operating mechanism, of a plurality of shifting members for the gearing, a neutralizing device for said shifting members, pneumatic operating devices for the respective shifting members adapted to move said shifting members into different gear positions, a pneumatic operating device for said neutralizing device, electro-magnetic control valves for the said pneumatic devices, a manually operable electric controller for the said valves comprising a single fixed contact for each gear position, a series of fixed contacts for said neutralizing device alternating with said single gear position contacts, and a movable contact adapted to successively engage one of said neutralizer contacts and one of said gear position contacts, and a switch connected with the clutch operating mechanism and serving to break the circuit to the controller when the clutch is in engaged position.

2. The combination in a remote control system, of gearing, shifting members for the gearing, pneumatic operating devices for the respective shifting members including cylinders with pistons therein, valves for admitting air to either end of each cylinder to move the piston and the corresponding shifting member in either direction, a separate neutralizing device including a cylinder with a piston therein, a valve for admitting air to the said cylinder, connections whereby the last said piston serves to return any one of the other pistons to neutral position, electro-magnetic means for operating the said valves, and controlling means for said electro-magnetic means adapted to effect operation of the neutralizing device prior to effecting the operation of any of the gear shifting members.

3. The combination in a remote control system, of gearing, shifting members for the gearing pneumatic operating devices for the respective shifting members including cylinders with pistons therein, valves for admitting air to either end of each cylinder to move the piston and the corresponding shifting member in either direction, a separate neutralizing device including a cylinder with a piston therein, a valve for admitting air to the said cylinder, connections whereby the last said piston serves to return any one of the other pistons to neutral position, and electro-magnetic means for operating the said valves, the said means serving to automatically operate the valve for the neutralizing device prior to the operation of the valve for either end of any of the first said cylinders.

4. In a remote control system of the type described, the combination with shiftable gearing, a clutch and clutch operating mechanism, of a plurality of shifting members for the gearing, pneumatic operating devices for the respective members, electro-magnetic control valves for the said devices, a manually operable control lever of the "H-movement" type, having four operative positions and a neutral position, and electric connections including contacts effective at each of the aforesaid five positions for operating the said valves.

CHARLES O. GUERNSEY.